United States Patent
Biermann

(10) Patent No.: US 6,935,699 B2
(45) Date of Patent: Aug. 30, 2005

(54) SEAT COVER FOR ALL TYPES OF SEATS IN MOTOR VEHICLES OR PLANES

(75) Inventor: Ernst Biermann, Joessnitz (DE)

(73) Assignee: Car Trim Fahzeugausstattungen Produktionsgesellschaft mbH, Plauen (DE)

(*) Notice: Subject to any disclaimer, the term of this patent is extended or adjusted under 35 U.S.C. 154(b) by 26 days.

(21) Appl. No.: 10/257,393

(22) PCT Filed: Apr. 18, 2001

(86) PCT No.: PCT/EP01/04411

§ 371 (c)(1),
(2), (4) Date: Jan. 15, 2003

(87) PCT Pub. No.: WO01/79023

PCT Pub. Date: Oct. 25, 2001

(65) Prior Publication Data

US 2003/0227212 A1 Dec. 11, 2003

(30) Foreign Application Priority Data

Apr. 18, 2000 (DE) .......................... 100 19 246

(51) Int. Cl.⁷ ................................. A47C 7/02
(52) U.S. Cl. ................................. 297/452.64
(58) Field of Search ............... 297/452.64, 452.63, 297/452.58, 452.62, 218.1, 219.1, 229

(56) References Cited

U.S. PATENT DOCUMENTS

| | | | | |
|---|---|---|---|---|
| 2,354,436 A | * | 7/1944 | Stedman ............... | 297/452.64 |
| 5,669,670 A | * | 9/1997 | Haraguchi et al. ..... | 297/452.61 |
| 6,196,627 B1 | | 3/2001 | Faust et al. ........... | 297/180.14 |

FOREIGN PATENT DOCUMENTS

| | | | |
|---|---|---|---|
| DE | 29608494 | * | 3/1974 |
| DE | 2346913 | * | 4/1974 |
| DE | 31 02 881 | | 8/1982 |
| DE | 4304870 | * | 9/1994 |
| DE | 43 04 870 | | 9/1994 |
| DE | 2330610 | * | 9/1996 |
| DE | 198 05 173 | | 6/1999 |
| FR | 2462129 | * | 3/1981 |
| JP | 2003-339485 | * | 5/2002 |
| WO | 99/54163 | | 10/1999 |

* cited by examiner

Primary Examiner—Milton Nelson, Jr.
(74) Attorney, Agent, or Firm—Jacobson Holman PLLC

(57) ABSTRACT

A cover for a seat in a motor vehicle or plane. The seat cover is made of a leather material which is provided with a braided area consisting of cord-like or strip-like elements in at least one point which comes under particular stress.

22 Claims, 1 Drawing Sheet

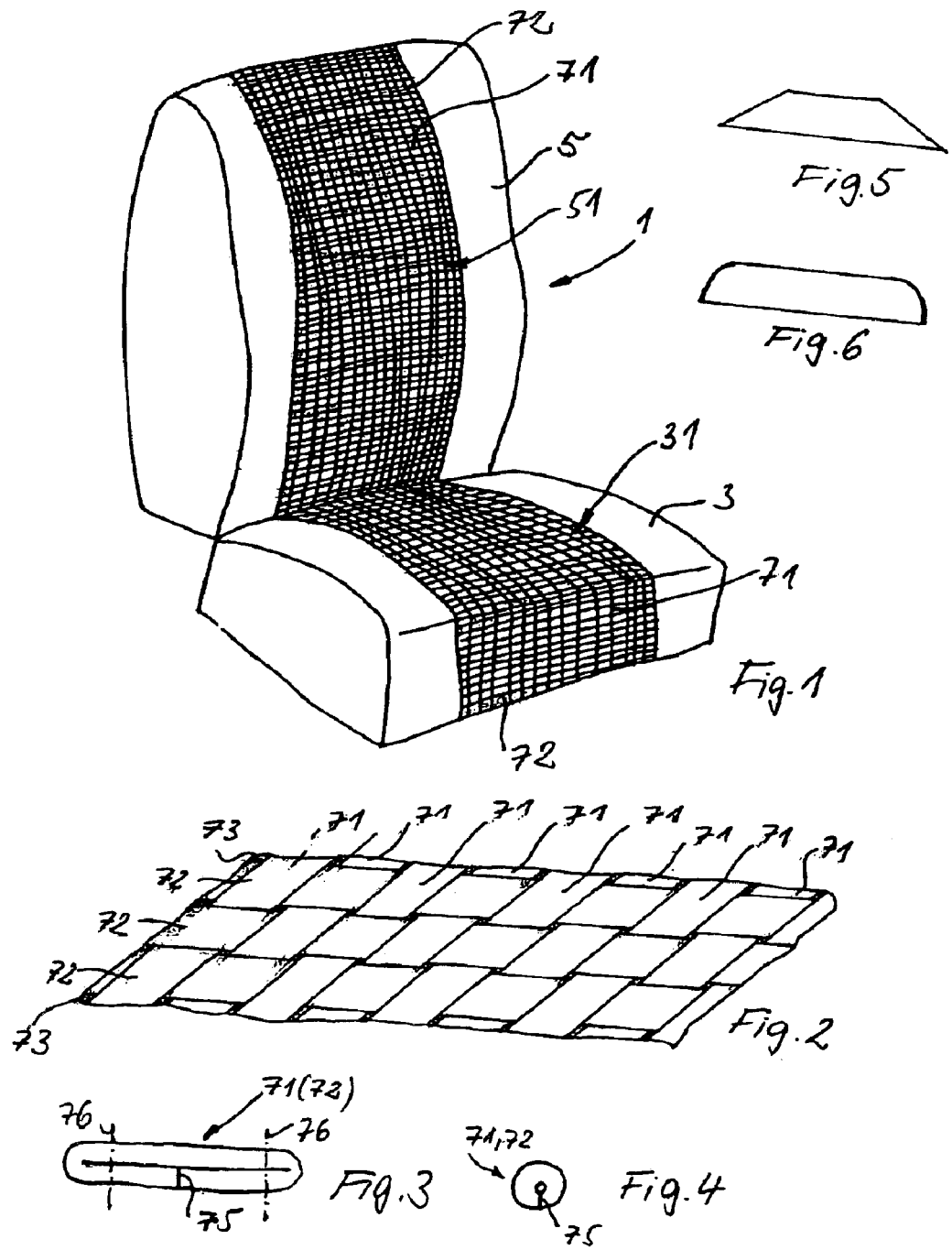

SEAT COVER FOR ALL TYPES OF SEATS IN MOTOR VEHICLES OR PLANES

This is a nationalization of PCT/EP01/04411 filed Apr. 18, 2001 and published in German.

BACKGROUND OF THE INVENTION

1. Field of the Invention

The present invention relates to a seat cover for all types of car and airplane seats.

2. Description of the Related Art

In the automobile industry, it is known in relation to seat covers made of leather to provide perforations in the leather material for improving the air circulation. However, a problem exists in the fact that the number of perforation holes is limited, because the stability of the punched leather material is reduced with an increasing amount of perforation holes. Another problem exists in the fact that the so-called processing of the leather, which determines the characteristics of the leather material, such as with regard to UV resistance, the form stability, and the abrasion resistance, is no longer maintained in the area of the cutting surfaces of the punched holes.

SUMMARY OF THE INVENTION

The task of the invention at hand is therefore in creating a seat cover for all types of car and airplane seats that has a relatively high stability at a comparatively high air and steam permeability.

This task is solved by a seat cover of a leather material having a plaited area made of cord or ribbon-shaped elements arranged in at least one location in the leather material.

The essential advantage of the seat cover according to the invention is that it contains an area made of plaited leather strips, or cords, respectively, or similar, which effects a high air and steam permeability at a high stability for achieving a comfortable seating climate. The related steam permeability of the flexible and punched surface structures creates ideal conditions for the discharge of body sweat into the absorbing material (non-woven fabric, foam material, felt, etc.) located beneath the weave.

The permanent air exchange ensures that moisture and temperature traps are avoided, and therefore the comfort feeling compared to a closed surface is substantially improved. Without a doubt, this also contributes to comfort and safety, since it is known that body parts that are wet with sweat in the areas of the back and bottom can lead to unconcentrated driving due to a lack of comfort feeling by the driver of an automobile.

Particularly preferred, the seat cover consisting of leather material at hand therefore contains plaited areas in those areas, in which a driver, or passenger, respectively, seated on the seat cover has particularly heavy contact with the seat. This is true especially for the essential area of the seat surface, and/or of the back surface.

An additional, very essential advantage of the invention at hand is that the cord or ribbon-like elements, from which the plaited area of the seat cover at hand is fabricated, is designed so that its lateral edges are created during the fabrication of the cord or ribbon-like elements from leather material that is equipped with the so-called overlay, or of a leather skin. Due to the special embodiment of the cord or ribbon-like elements, they are rounded or folded over by means of cutting or perforation operations in such a way that the so-called overlay remains intact, which for example is the determining factor for UV resistance, form stability, and abrasion resistance of the elements of the plaited area. With the contact of, for instance, a pair of jeans worn by a passenger, or a driver sitting on the seat cover at hand, these rounded lateral edges of the elements mentioned are therefore not mechanically stressed in any substantial way due to their rounded of shape by means of rough seams, or sharp edges, such as by attached pockets, or jeans rivets. Additionally, due to the rounding, the so-called overlay of the elements also remains intact even during use, i.e. during the entire life span of the seat cover according to the invention.

A further essential advantage exists in the fact that due to the arrangement of the plaited areas in a seat cover embodied in the manner at hand, particularly in the previously mentioned contact areas, the entire seat cover can be equipped with a completely novel decor (such as a checkerboard pattern, or something similar), if the individual cord or ribbon-like elements contain different colors (such as black and silver-gray). In order to achieve a coordinated look of the interior of the airplane or automobile with the seat covers, areas in the automobile roof, the dashboard, in the side casings, the back rests, covers, and such of the vehicle or airplane that correspond to the plaited areas of the seat covers.

It is particularly advantageous if the seat covers at hand are used both as the initial covers and as retrofitted covers, i.e. slip covers.

BRIEF DESCRIPTION OF THE DRAWINGS

The invention and its embodiments are explained in context with the figures is explained in more detail as follows. They show:

FIG. 1 a schematic illustration of a seat cover (initial cover or retrofitted cover) that contains plaited areas in the contact surfaces of the driver or passenger;

FIG. 2 a section of the plaited area of a seat cover of FIG. 1 in an enlarged illustration;

FIGS. 3 and 4 preferred embodiments of the cord or ribbon-like elements of the plaited areas, and FIGS. 5 and 6 further embodiments of the invention.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows the seat cover of an automobile or an airplane of the invention at hand identified by 1. The seat cover 1 is essentially comprised of the cover component 3 covering the seat component, as well as a cover component 5 covering the back rest. In a recognizable way, a plaited area 31, or 51 is provided in all, or only part of the contact surfaces of a person sitting on the seat, for example in the center area of the cover component 3, and/or the cover component 5, which consists of plaited, intersecting elements 71 and 72 that are positioned at an angle of, for example, 90° to one another in lateral, or longitudinal direction of the cover components 3 and/or 5.

It is obvious that the entire seat cover receives a special optical appearance or design from the arrangement of the plaited areas 31, 51. This is especially true if the elements 71, 72 of the plaited areas 31 or 51 differ in their optical appearance. An example of such a difference would be, in particular, if they were dyed two different colors. The elements 72 positioned in lateral direction, for instance, can be dyed black, and the plaited elements 71 positioned in longitudinal direction can be dyed silver-gray. The optical appearance can also be designed by the type of plaiting of the elements 71, 72.

Reference is therefore made to the fact that in order to achieve a harmonic total impression in an automobile or airplane passenger area, plaited areas corresponding to the plaited areas 31 and/or 51 can also be provided in the interior casing of the automobile or the airplane (such as in the roof, the side casing, the casing of the dashboard, etc.).

The plaited areas are attached to the edges of recesses, preferably stitched, that are located in the leather material of the seat cover 1.

An enlarged section of the plaited areas 31 or 51 is schematically illustrated in FIG. 2. The intersecting elements 71 and 72 are arranged or stitched on a base 73 that consists of an air permeable material. For example, the base 73 consists of a felt, non-woven fabric, batting, or foam material, while the elements 71, 72 consist of leather. The material of the base 73 ensures an air permeability of the plaited areas 31, 51.

An essential characteristic of the invention at hand consists in the fact that the elements 71, 72 are made in such a way that they possess the so-called overlay of the leather material surface also in their edge areas, from which they are manufactured. This so-called overlay relates to the surface treatment of the leather base material from which the elements are processed, for example by means of perforating or cutting. Normally, this overlay is lost in the cutting or perforation operations in the area of the resulting cutting or punching edges, because the leather in this area is cut or punched vertically to the treated surface. The invention at hand provides that, for example according to FIG. 3, which shows a cross section through a band-shaped element, the element is rounded along its longitudinal edges, because the lateral areas of the cut or punched elements are folded over so that the longitudinal edges formed show the surface and overlay of the leather. Preferably, the lateral areas of the elements 71, 72 are folded so far that their edges are butted against each other at the rear side of the elements at the location 75. In order to keep the lateral areas that are folded and butted against each other at the location 75 in the shape illustrated in FIG. 3, they are preferably attached to the interior surface of the elements, particularly glued. In an alternative embodiment, the folded lateral areas can also be attached by stitching (seams 76).

FIG. 4 shows an embodiment in which the elements 71, 72 are designed like a rope, and have an approximately circular cross section. The ends of the folded lateral areas of the initially stripe-shaped elements are also attached by butting against each other at a location 75, preferably glued.

Reference is made to the fact that other, such as triangular, or oval cross section shapes of the elements 71, 72 are also possible.

According to FIGS. 5 and 6 it is also conceivable to instead of producing the rounded edges of the elements 71, 72 by folding, to cut or punch the rope or ribbon-shaped elements from a base leather material in such a way that the edges receive a slant during the punching operation (FIG. 5), or a rounded shape (FIG. 6), which serves as protection from excessive mechanical wear when the driver or passenger sits on the plaited area (31 or 51). Due to the fact that the overlay is lost in this case, it should be reconstructed after the cutting or punching operation in individual process steps performed on the cutting surfaces.

With regard to the invention at hand, it is also important that a substantially better use of base material (skins) can be achieved by means of the arrangement of the plaited areas (31, 51) in seat covers made of leather. While a mere 60% to 65% use of base materials is normally possible with the punching of relatively large surface leather pieces for the production of seat covers, because they contain damaged areas, and for instance, undesired pores, or other intolerable fault characteristics, the punching of the elements (71, 72) at hand, which are relatively small, achieves a substantially larger use by means of a suitable arrangement of the punching knives by avoiding damaged areas or pores, etc. This achieves a sensible and economic use of available resources.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A seat cover for at least one of an automobile seat and an airplane seat comprising a leather material having a plaited area made of a plurality of intersecting elements arranged in at least one location in the leather material, said intersecting elements being ribbon-shaped and attached at an edge of the leather material.

2. The seat cover according to claim 1, wherein the elements are cut from a leather base material in such a way that lateral cutting surfaces of said elements possess a rounded shape.

3. The seat cover according to claim 1, wherein the plaited area is arranged on a cover component covering a center area of a seat component of at least one of an automobile seat and an airplane seat.

4. The seat cover according to claim 1, wherein the plaited area is arranged in a center area of a cover component covering a back rest of at least one of an automobile seat and an airplane seat.

5. The seat cover according to claim 1, wherein some of said plurality of elements of the plaited area are dyed differently from others of said plurality of elements in order to achieve an optical effect.

6. The seat cover according to claim 5, wherein the elements of the plaited area running in one direction are dyed differently than are the elements of the plaited area running in a different direction.

7. The seat cover according to claim 1, wherein the elements of the plaited area are arranged on a base made of an air permeable and moisture discharging material.

8. The seat cover according to claim 7, wherein the air permeable material includes at least one of felt, non-woven fabric, batting, and foam material.

9. The seat cover according to claim 1, wherein the elements of the plaited area are punched from a leather base material, and lateral areas of the elements are folded in order to form rounded longitudinal edges, said folded areas being attached to an interior surface of the elements.

10. The seat cover according to claim 9, wherein the folded lateral areas are dimensioned in such a way that they are butted against each other at a location at a rear side of the elements.

11. The seat cover according to claim 9, wherein the folded areas are attached to the interior surface of the elements by stitching.

12. The seat cover according to claim 9, wherein the folded areas are attached to the interior surface of the elements by gluing.

13. The seat cover according to claim 1, wherein the elements are punched from a leather base material in such a way that lateral punched surfaces of said elements possess a slanted shape.

14. The seat cover according to claim 13, wherein the punched surfaces of the elements are equipped with an overlay of the leather base material.

15. The seat cover according to claim 1, wherein the plaited area is inset in a cut-out in the leather material.

16. The seat cover according to claim 15, wherein the plaited area is attached to an adjacent edge of said leather material by stitching.

17. The seat cover according to claim 1, wherein the plaited area is attached to said leather material edge by stitching.

18. The seat cover according to claim 1, wherein the elements are cut from a leather base material in such a way that lateral cutting surfaces of said elements possess a slanted shape.

19. The seat cover according to claim 18, wherein the cutting surfaces of the elements are equipped with an overlay of the leather base material.

20. The seat cover according to claim 1, wherein the elements are punched from a leather base material in such a way that lateral punched surfaces of said elements possess a rounded shape.

21. A seat cover for at least one of an automobile seat and an airplane seat comprising a leather material having a plaited area made of a plurality of intersecting elements arranged in at least one location in the leather material, lateral areas of said elements being folded in order to form rounded longitudinal edges, said folded lateral areas being dimensioned in such a way that free edges of said folded lateral areas are butted against one another at a location at a rear side of said elements.

22. A seat cover for at least one of an automobile seat and an airplane seat comprising a leather material having a plaited area made of a plurality of intersecting elements arranged in at least one location in the leather material, said plaited area being inset in a cut-out in the leather material.

* * * * *